United States Patent [19]
Balz et al.

[11] Patent Number: 5,460,074
[45] Date of Patent: Oct. 24, 1995

[54] VACUUM BRAKE POWER BOOSTER

[75] Inventors: Jürgen Balz, Wiesbaden; Karlheinz Bill, Dreieich; Horst Krämer, Dietzenbach; Peter Drott, Frankfurt; Jurgen Bauer, Wiesbaden; Heinz Zingel, Bad Camberg; Holger Von Hayn, Bad Vilbel; Ralf Harth, Obenursel; Jürgen Schonlau, Walluf; Wolfgang Ritter, Oberursel, all of Germany

[73] Assignee: ITT Automotive Europe GmbH, Germany

[21] Appl. No.: 256,497

[22] PCT Filed: Oct. 16, 1993

[86] PCT No.: PCT/EP93/02857
§ 371 Date: Sep. 30, 1994
§ 102(e) Date: Sep. 30, 1994

[87] PCT Pub. No.: WO94/11226
PCT Pub. Date: May 26, 1994

[30] Foreign Application Priority Data

Nov. 13, 1992 [DE] Germany ............... 42 38 333.1
Jul. 23, 1993 [DE] Germany ............... 43 24 688.5

[51] Int. Cl.⁶ ............................................. F15B 9/10
[52] U.S. Cl. ............................. 91/369.1; 91/376 R
[58] Field of Search ........................... 91/369.1, 369.2, 91/376 R; 92/96, 98 R

[56] References Cited

U.S. PATENT DOCUMENTS

| | | |
|---|---|---|
| 4,608,825 | 9/1986 | Fontaine . |
| 5,096,267 | 3/1992 | Volz ..................... 91/369.1 X |
| 5,172,964 | 12/1992 | Levrai et al. ........... 91/376 R X |
| 5,233,904 | 8/1993 | Gautier et al. .......... 91/376 R X |

FOREIGN PATENT DOCUMENTS

| | | |
|---|---|---|
| 0140187 | 5/1985 | European Pat. Off. . |
| 0478396 | 4/1992 | European Pat. Off. . |

Primary Examiner—Edward K. Look
Assistant Examiner—Hoang Nguyen
Attorney, Agent, or Firm—Dykema Gossett

[57] ABSTRACT

A vacuum brake power booster for automotive vehicles having control valve which is operable, irrespective of an actuating rod displacing a valve piston (9), by an electromagnet which actuates a third sealing seat thereby ventilating the working chamber. To minimize the independent actuating force generated by the electromagnet the electromagnet, of the present invention, is rigidly connected to the valve piston, and is arranged to be slidable in the control housing so that the third sealing seat is synchronously movable with the valve piston.

35 Claims, 8 Drawing Sheets

VACUUM BRAKE POWER BOOSTER

TECHNICAL FIELD

The present invention relates to a vacuum brake power booster for automotive vehicles and more particularly to a vacuum brake power booster for automotive vehicles having a booster housing whose interior is subdivided into a vacuum chamber and a working chamber and wherein the booster housing includes a control housing carrying the movable wall and accommodating a control valve which controls the pressure differential acting upon the movable wall.

BACKGROUND OF THE INVENTION

A vacuum brake power booster of this general type is disclosed in European patent application 0 478 396 A1. The electromagnet in this prior-art vacuum brake power booster which actuates the third sealing seat guided in the control housing is associated with the control housing or, rather, is immovably arranged in a recess thereof facing the vacuum chamber. On independent actuation of the vacuum brake power booster by the electromagnet, relative movement occurs between the control housing or, respectively, a third sealing seat and the valve piston. This means lost travel must be additionally overcome by the electromagnet which already must generate a high amount of actuating force at the beginning of the independent actuation in order to open the control valve in opposition to the forces caused at its valve member.

Also, the problems arising with the assembly of a master brake cylinder which projects into the booster housing, are considered unfavourable and can only be overcome by modifying the assembly dimensions of the brake power booster.

Therefore, the object of the present invention is to propose arrangements which considerable reduce the independent actuating force to be generated by the electromagnet.

This object is achieved by the present invention in that the electromagnet, rigidly coupled to the valve piston, is arranged so as to be slidable in the control housing so that the third sealing seat is synchronously movable with the valve piston.

To realize the inventive idea, in an advantageous improvement upon the present invention, wherein a push rod transmitting the output force of the vacuum brake power booster takes support on the control housing by the intermediary of a rubber-elastic reaction disc, the electromagnet is arranged in a preferably bowl-shaped axial extension of the valve piston, the extension being closed by a closure member which, additionally, permits transmitting the input force introduced at the actuating rod to the reaction disc. This design is compact and does not require an increased axial overall length and which permits to expediently integrate a master brake cylinder connected downstream of the vacuum brake power booster in the booster housing.

In order to obtain a favourable course of the lines of flux generated by the electromagnet, according to another favourable improvement upon the subject matter of this invention, the armature of the electromagnet is partly guided in the closure member, the force transmission between the third sealing seat and the armature taking place by means of a cylindrical pin to which a force-transmitting plate carrying the third sealing seat is secured. These provisions permit to reduce magnetic losses which are caused by stray fluxes or radial forces, respectively.

In a weight-optimized design variant of the subject matter of the present invention, the third sealing seat is provided on a ring which is sealedly guided in the control housing and is connected to the force-transmitting plate by means of at least two retaining arms, preferably opposed in radial direction. Preferably, the force-transmitting plate has a rectangular configuration and can be arranged in a radial groove in the valve piston.

Further, it is preferable that the third sealing seat is interposed radially between the two sealing seats.

Proper functioning of the brake power booster according to the present invention, in particular upon return movement of the movable wall, is ensured in another favourable embodiment in that the third sealing seat is arranged in an axially offset manner with respect to the second sealing seat. Reliable guidance of the armature is provided by guiding the pin in the closure member and in a guide portion arranged in the extension of the valve piston.

Another advantage of the present invention is especially suited for application on the so-called lost-travel minimized vacuum brake power boosters, the valve pistons of which abut on stops on the booster housing via transverse members which are arranged in the control housing with axial play. To ensure that the release behaviour of such a vacuum brake-power booster in the pressure decrease mode corresponds largely to that of a device which is not actuatable by independent force, according to the present invention, the third sealing seat, in the release position, is arranged at a distance from the valve member which is larger than, or equal to, the distance between the transverse member and a stop surface provided in the control housing and allowing to entrain the transverse member on actuation. A spring serves to reset the third sealing seat to its initial position after independent actuation has been effected, which is interposed between the armature and the guide portion and biases the armature in opposition to the actuating direction of the electromagnet.

In order to initiate a controlled braking operation or a desired delay, respectively, in another favourable design variant of the present invention, the third sealing seat is operable only to the effect of separating the chambers. A valve operable independently of the electromagnet is provided which allows the working chamber to be ventilated irrespective of the control valve. These provisions permit a clear separation of two functions which, otherwise, have to be performed merely by the third sealing seat (no pulsed control being required for realizing a mode in which the pressure is maintained constant). The valve designed as a pneumatic solenoid valve (which is closed when deenergized) is arranged at the housing half confining the working chamber, thereby accomplishing an additionally enhanced reliability in function of the vacuum brake power booster according to the present invention, in particular when power failure occurs.

Improving or, respectively, optimizing the relationship between the resetting force acting upon the second sealing seat and the reaction force of the vacuum brake power booster according to the present invention is achieved in another favourable embodiment of this invention by the valve member in the control housing confining a pneumatic chamber, to which the pneumatic pressure prevailing in the working chamber is applicable.

A particularly short flow path upon ventilation and evacuation of the pneumatic chamber or, respectively, a rapid change in pressure in the pneumatic chamber is achieved in another embodiment of the subject matter of the present invention by the valve member being provided with at least one passage in the area of its sealing surface, which forms a connection between an annular chamber confined by the sealing seats and connected with the working chamber, and the pneumatic chamber.

Finally, another favourable embodiment of the present invention is characterized by the valve member being provided with a radially inwardly disposed sealing lip in the area of its sealing surface which lip, together with a retaining ring holding the valve member in the control housing, confines the pneumatic chamber. Effective sealing of the pneumatic pressure compensating chamber is ensured by this provision.

To permit a specific, adjusted introduction of the independent brake force, which is not initiated by the driver but is to be generated by the electromagnet, in another embodiment of the subject matter of the invention, a means is provided which permits detection of the actual position of the valve member. The adjusted introduction of the independent brake force accomplished by this measure is necessary in all possible applications in which not only the maximum independent braking pressure, not initiated by the driver, is desired, but, for example, a precisely adjusted period of preservation of the aimed-at actuating condition.

Preferably, the mentioned means permits direct sensing of the actuating travel of the valve member. In the direct sensing, the actuating travel of the valve member is sensed by means of a Hall effect sensor. Two embodiments are possible.

In the first embodiment, the Hall effect sensor is accommodated in the control housing, preferably in the area of the first sealing seat, and cooperates with a permanent magnet which is integrated in the valve member. In the second embodiment, the Hall effect sensor is provided in the valve member, while the permanent magnet is arranged in the control housing, preferably in the area of the first sealing seat.

With respect to the modifications which, for the direct sensing, are necessary to be made to the valve member manufactured in large-scale series production, it is further suggested to provide a means which permits an indirect sensing of the actuating travel of the valve member, preferably, sensing of the actuating travel of the armature of the electromagnet. For this purpose, the actuating travel of a ring carrying the third sealing seat is defined, which ring cooperates with a force-transmitting plate coupled to the armature. According to the present invention, a permanent magnet is arranged in the force-transmitting plate to this end which cooperates with a Hall effect sensor integrated in the valve piston. In this type of sensing, there is no proportional relation to the actuating travel of the valve member until the third sealing seat abuts on the valve member so that this area must be taken into account in analyzing the output signal of the Hall effect sensor, for example, by way of a microcontroller.

Another principal possibility of indirect sensing is to provide a means which permits sensing the density of the magnetic flux in the working air gap of the electromagnet, while the current supplied to the electromagnet is measured simultaneously. Preferably, the working air gap of the electromagnet is confined by the armature, on the one hand, and by a cylindrical guide portion designed within the valve piston, on the other hand.

A favourable improvement upon the last-mentioned embodiment is that an analogously operating Hall effect sensor is arranged in the guide portion on its side facing the armature. This provision permits to continuously sense the flux density of the electromagnet.

In order to prevent the decrease of the end surface of the guide portion which is required to generate the electromagnetic force, according to another embodiment of the subject matter of the invention, the Hall effect sensor is arranged in the return path of the electromagnet, preferably, and is preferably integrated in the wall of a cylindrical extension of the valve piston which accommodates the electromagnet.

To ensure that the independent actuation of the brake power booster according to the present invention is in fact completed, in particular after an auxiliary-force-assisted braking operation has already been performed, in another favourable embodiment of the subject matter of the present invention an electrical switching means is provided, the control signals of which influence the current supply of the electromagnet, more particularly permit its disconnection. Preferably, the switching means is a microswitch arranged at the valve piston as well as an actuating element arranged at or in the control housing.

The switching travel of the mentioned microswitch is extended in an advantageous improvement upon the present invention in that the switching means is operable by a relative movement between the valve piston and the control housing. It is particularly favourable that the actuating element is arranged so as to be movable relative to the control housing and resiliently biassed in opposition to the actuating direction. The actuating element abuts on a stop on the booster housing under the preload of a compression spring in such a manner that an axial clearance forms at its end close to the microswitch between it and the control housing.

An effective tolerance compensation at the actuating element is achieved according to another favourable embodiment of the present invention in that the actuating element is formed of two resiliently biassed parts which are telescopically guided in one another, in particular an actuating tappet that is sealedly guided in the control housing and cooperates with the stop, and a sleeve which is anchored at the actuating tappet in a resiliently biassed manner, which is arranged coaxially to the actuating tappet and cooperates with the microswitch. This provision reliably prevents any damage to the microswitch.

To ensure a reliable disconnection of the electromagnet, in particular after a braking operation assisted by independent force has been completed, in another embodiment of the subject matter of the present invention, the valve piston is in axial abutment with a reaction disc, transmitting the output force of the vacuum brake power booster, by means of a transmission disc which is mounted in the control housing so as to be axially movable within limits, the movement of which, in "opposition" to the actuating direction of the vacuum brake power booster, is limited by a stop (annular surface) provided in the control housing and allowing further movement of the valve piston in opposition to the actuating direction.

Finally, the assembly of the vacuum brake power booster according to the present invention is facilitated in that the control housing is of bipartite design and includes a front part, which is positively connected with a guide portion accommodating the control valve, and which accommodates the force output member (push rod), the reaction disc and the transmission disc.

The present invention will be explained in more detail in the following description of six embodiments with reference

DETAILED DESCRIPTION OF THE PREFERRED EMBODIMENTS

Figure 1:
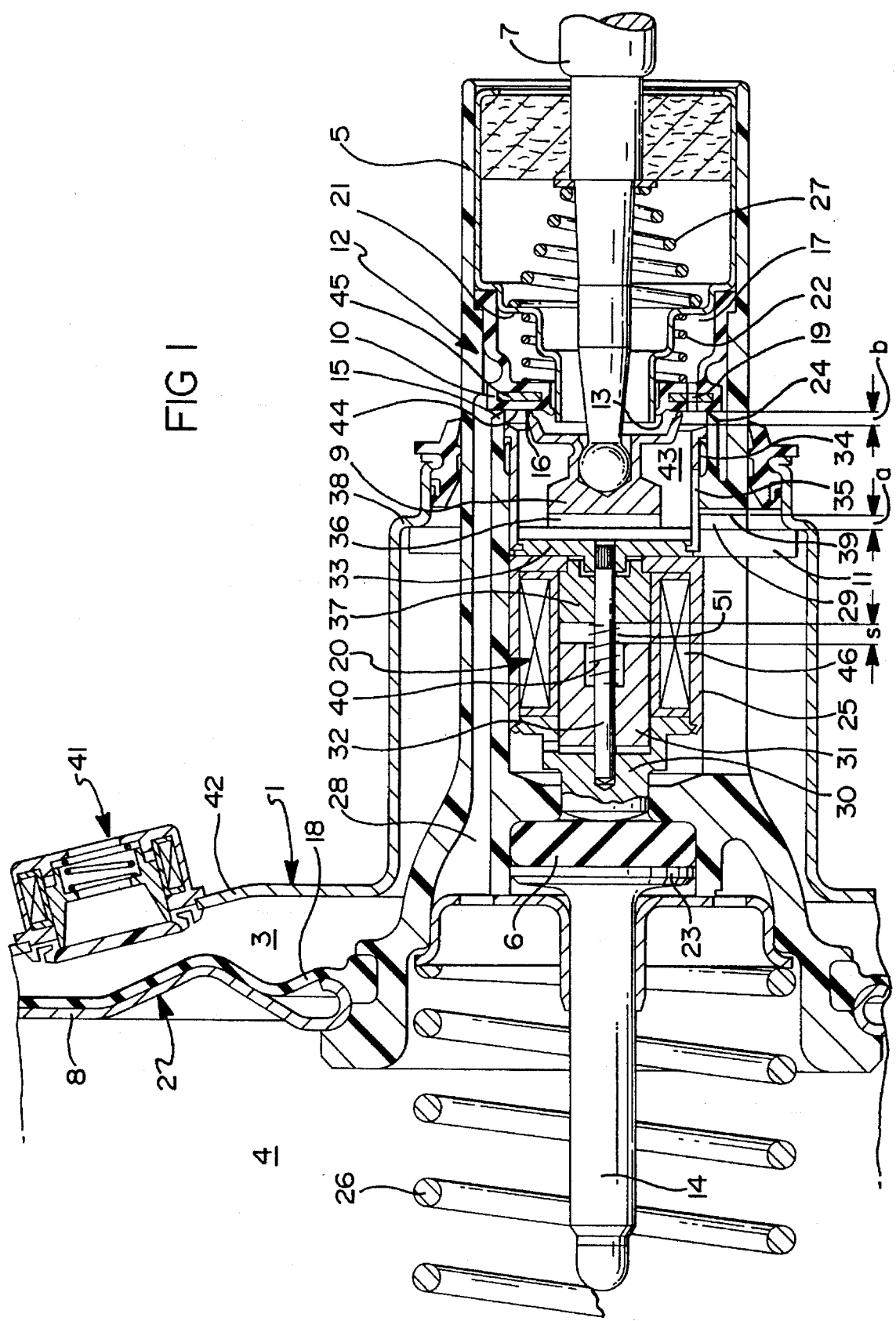
FIG. 1 is a first embodiment of the vacuum brake power booster according to the present invention shown in a partial longitudinal cross-section.

The booster housing 1, sketched only schematically, of the vacuum brake power booster according to the present invention illustrated in the drawing is subdivided by an axially movable wall 2 into a working chamber 3 and a vacuum chamber 4. The axially movable wall 2 is composed of a diaphragm plate 8, deep-drawn from sheet metal, and a flexible diaphragm 18 abutting thereon which, not shown in more detail, forms a rolling diaphragm as a sealant between the outward periphery of the diaphragm plate 8 and the booster housing 1.

A control valve 12 operable by an actuating rod 7 is accommodated in a control housing 5, which is sealedly guided in the booster housing 1 and carries the movable wall 2, and is composed of a first sealing seat 15 provided on the control housing 5, a second sealing seat 16 provided on a valve piston 9 coupled to the actuating rod 7, as well as a valve member 10 cooperating with the two sealing seats 15, 16 and being urged against the valve seats 15, 16 by means of a valve spring 22 which takes support on a retaining ring 21. The working chamber 3 is connectible to the vacuum chamber 4 through a channel 28 which extends laterally in the control housing 5.

By way of a rubber-elastic reaction disc 6 abutting on the frontal end of the control housing 5 as well as a push rod 14 including a head flange 23, the brake force is transmitted onto an actuating piston of a non-illustrated master cylinder of the brake system which is arranged on the vacuum-side booster housing half not shown.

A resetting spring 26, illustrated schematically in the drawing and taking support on a non-illustrated flange at the vacuum-side front wall of the booster housing 1, keeps the movable wall 2 in the initial position shown. Further, a second compression spring 27 is provided which is supported on the actuating rod 7, on the one hand, and on the retaining ring 21, on the other hand, and the force of which causes the valve piston 9 or its valve seat 16 to be biassed in relation to the valve member 10.

To connect the working chamber 3 to the atmosphere when the control valve 12 is actuated, finally, a channel 29, which extends in a generally radial direction, is provided in the control housing 5. The return movement of the valve piston 9 at the end of a braking operation is limited by a transverse member 11 which, in the release position of the vacuum brake power booster shown in the drawing, abuts on a stop 38 provided in the booster housing 1.

Further, as can be gathered from FIG. 1, the valve member 10 includes an annular sealing surface 44 which cooperates with the two sealing seats 15, 16 and which is reinforced by means of a metal reinforcing disc 45 and is furnished with a plurality of axial ducts 19. Succeeding the sealing surface 44 in radially inward direction is a sealing lip 13 which, in the mounted condition of the valve member 10 in the control housing 5, is in sealing abutment with said,s inside wall or, respectively, the previously mentioned retaining ring 21 retaining the valve member 10, so that a pneumatic chamber 17 in the control housing 5 is confined. The flow channels which are formed by the ducts 19 and the openings b, yet are not referred to in detail, connect the pneumatic chamber 17 with an annular chamber 43 which is confined by the sealing seats 15, 16 and in which the above-mentioned pneumatic channel 29 terminates, so that the pneumatic chamber 17, which is provided on the side of the valve member 10 remote from the sealing surface 44, is in constant communication with the working chamber 3, and pressure compensation takes place at the valve member 10.

Consequently, the arrangement described permits to reduce the difference between the reaction force of the vacuum brake power booster and the resetting force acting at the valve piston to the effect that, with the reaction force remaining the same, an increase in the resetting force is possible or, with the resetting force remaining the same, a reduction in the reaction force is possible, the hysteresis of the brake power booster according to the present invention being improved as a result.

To initiate an independent actuation of the vacuum brake power booster according to the present invention which is irrespective of the actuating rod 7, a third sealing seat 24 is interposed radially between the first 15 and the second sealing seat 16 and is operable by means of an electromagnet 20 which, preferably, is arranged in an axial bowl-shaped extension 25 of the valve piston 9 and, consequently, together with the valve piston 9, is displaceable in the control housing 5. The electromagnet 2 is composed of a coil 46, which is slipped onto a guide portion 37 secured within the extension 25, as well as a cylindrical armature 31 which is slidably arranged therein and is undetachable connected with a pin 32 that is guided in the guide portion 37, on the one hand, and in a closure member 30 closing the extension 25, on the other hand. A working air gap 51 of the electromagnet 20 is confined by the armature 31, on the one hand, and the guide portion 37, on the other hand. At its end close to the actuating rod 7, the pin 32 carries a force-transmitting plate 33 which, preferably, is of a rectangular design and is arranged in a radial groove 36 of the valve piston 9 and which renders it possible that the independent actuating force generated by the electromagnet 20 is transmitted to the third sealing seat 24. To this end, the third sealing seat 24 is provided on a ring 34 guided sealedly in the control housing 5 and being connected to the force-transmitting plate 33 by means of two or more retaining arms 35.

Interposed between the armature 31, which partly projects into the closure member 30, and the guide portion 37 is a compression spring 40 which keeps the armature 31 in its initial position in which the third sealing seat 24 is arranged in a manner axially offset in relation to the second sealing seat 16 provided on the valve piston 9 (see distance b). The closure member 30 guided in the control housing 5 abuts on the previously mentioned reaction disc 6 and permits to transmit the input force introduced at the actuating rod 8 to the reaction disc 6.

In the event of an independent braking operation initiated by energization of the coil 46, the armature 31 is displaced to the right in the drawing in opposition to the force of the compression spring 40, as a result whereof the third sealing seat 24, after having bridged the distance "b", moves into abutment with the sealing surface 44 of the valve member 10. The first sealing seat 15 provided on the control housing 5 is bridged in terms of effect by this abutment so that there is no connection between vacuum chamber 4 and working chamber 3. Subsequently, the third sealing seat 24 and the valve member 10 move along together, the second sealing seat 16 being opened and the working chamber 3 being ventilated.

The movement of the third sealing seat 24 continues until the armature 31 abuts on the guide portion 37 and the gap "s" between the two parts becomes zero. In the absence of actuating force at the actuating rod 7, the control housing 5 advances in relation to the valve piston 9 by a travel which corresponds to the distance "a" between the transverse member 11 and a stop surface 39 provided on the control housing 5. The reason herefor is the piston rod return spring 27 which, through the actuating rod 7, moves the valve piston 9 to the right and tries to close the second sealing seat 16 again. However, as the third sealing seat 24 is entrained synchronously due to the rigid connection between electromagnet 20 and valve member 9, the gap between the valve member 10 and the second sealing seat 16 is kept open, and namely by the amount s-b. This connects the working chamber 3 to the atmosphere, and a brake force is transmitted to the master cylinder.

The pressure-retaining mode can be achieved either by alternating switching on and off or by analog control of the electromagnet 20. After the electromagnet 20 has been switched off, the armature 31 along with the third sealing seat 24 moves to the left by the action of spring 40, whereby the third sealing seat 24 is opened, while the valve member 10 biassed by the control valve spring 22 closes the second sealing seat 16. As the first sealing seat 15 remains open, as mentioned above, the atmosphere is removed through the open connection between vacuum chamber 4 and working chamber 3 from the latter so that the pressure prevailing in the master cylinder is reduced. Subsequently, after a very short time interval, the electromagnet 20 is energized again so that again pressure develops in the master cylinder. Thus, the inertia of the system during ventilation and evacuation of the working chamber 3 permits to realize a desired pressure value by a pulsed actuation of the electromagnet 20.

The pressure decrease mode is realized by switching off the electromagnet 20, the third sealing seat 24 being opened and the second sealing seat 16 being closed. Through the open first sealing seat 15, the working chamber 3 is vented so long until the resetting spring 26 resets the control assembly into its initial position, and the transverse member 11 moves into abutment with the stop 38. The control housing 5 can move so long until it abuts on the side of the transverse member 11 which, in the drawing, is the left-hand side, and the first sealing seat 15 is closed. Then, the apparatus is in its release position.

However, as an alternative it is also possible to achieve the same type of control as discussed above by combining possible is an alternative of the independent actuation in which case] the function of the previously described electromagnet 20 with the function of valve 41. Valve 41 is provided as a pneumatic solenoid valve (closed when deenergized and is preferably arranged at the housing half 42 of the booster housing confining the working chamber 3. Valve 41 allows ventilation of the working chamber 3 irrespective of the control valve 12 and is actuated independently of the electromagnet 20. In this embodiment, the third sealing seat 24 serves merely to isolate the chambers 3, 4 by moving into abutment with the valve member 10.

Both the electromagnet 20 and the solenoid valve 41 are energized during an independent braking operation. Opening the latter valve permits the atmosphere to enter the working chamber 3, while the valve's connection to the vacuum chamber 4 is kept closed by the closed third sealing seat 24.

By disconnecting the solenoid valve 41 when a desired pressure value is reached, its sealing seat not referred to in more detail is closed so that the instantaneous condition is preserved and a pressure-retaining mode is realized.

When the electromagnet 20, too, is disconnected, the pressure decrease is performed in the same way as has already been explained above.

Figure 2:
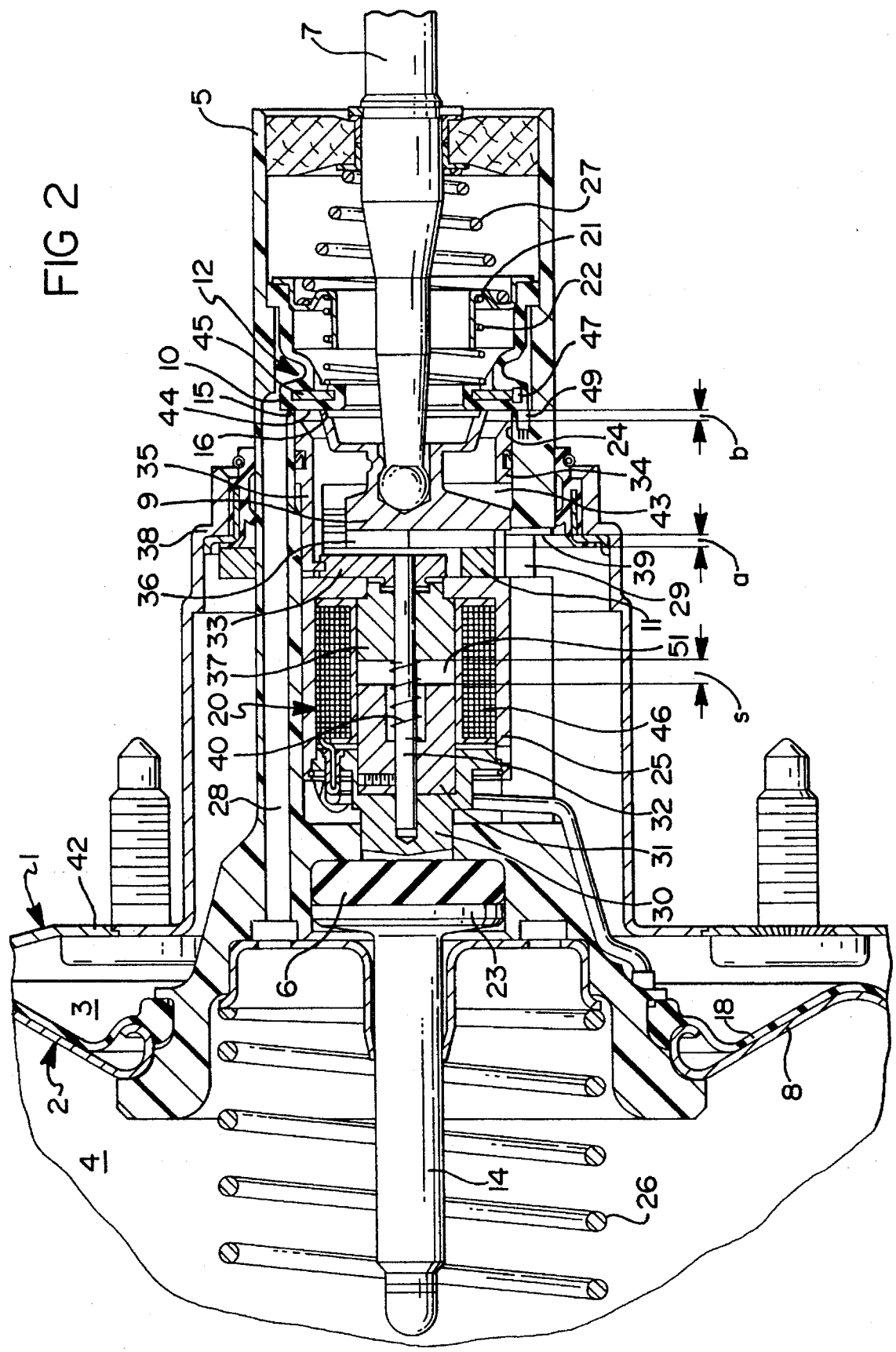
FIG. 2 is a modified second embodiment of the vacuum brake power booster according to the present invention in a view corresponding to FIG. 1.

As can be seen in FIG. 2 in particular, a second embodiment of the vacuum brake power booster according to the present invention shown and provides a means which permits direct sensing of the actuating travel of the valve member 10 of the control valve 12. The mentioned means is composed of a Hall effect sensor 49 which senses variations in the magnetic field of a permanent magnet 47 which are due to variations in the actuating travel of the valve member 10. While the Hall effect sensor 49 in the embodiment illustrated is provided in the area of the first sealing seat 15 arranged at the control housing 5 and the permanent magnet 47 is integrated in the valve member 10 axially opposite to the Hall effect sensor 49, likewise another non-illustrated design variant is possible in which the Hall effect sensor is arranged in the valve member and the permanent magnet is arranged in the control housing.

Figure 3:
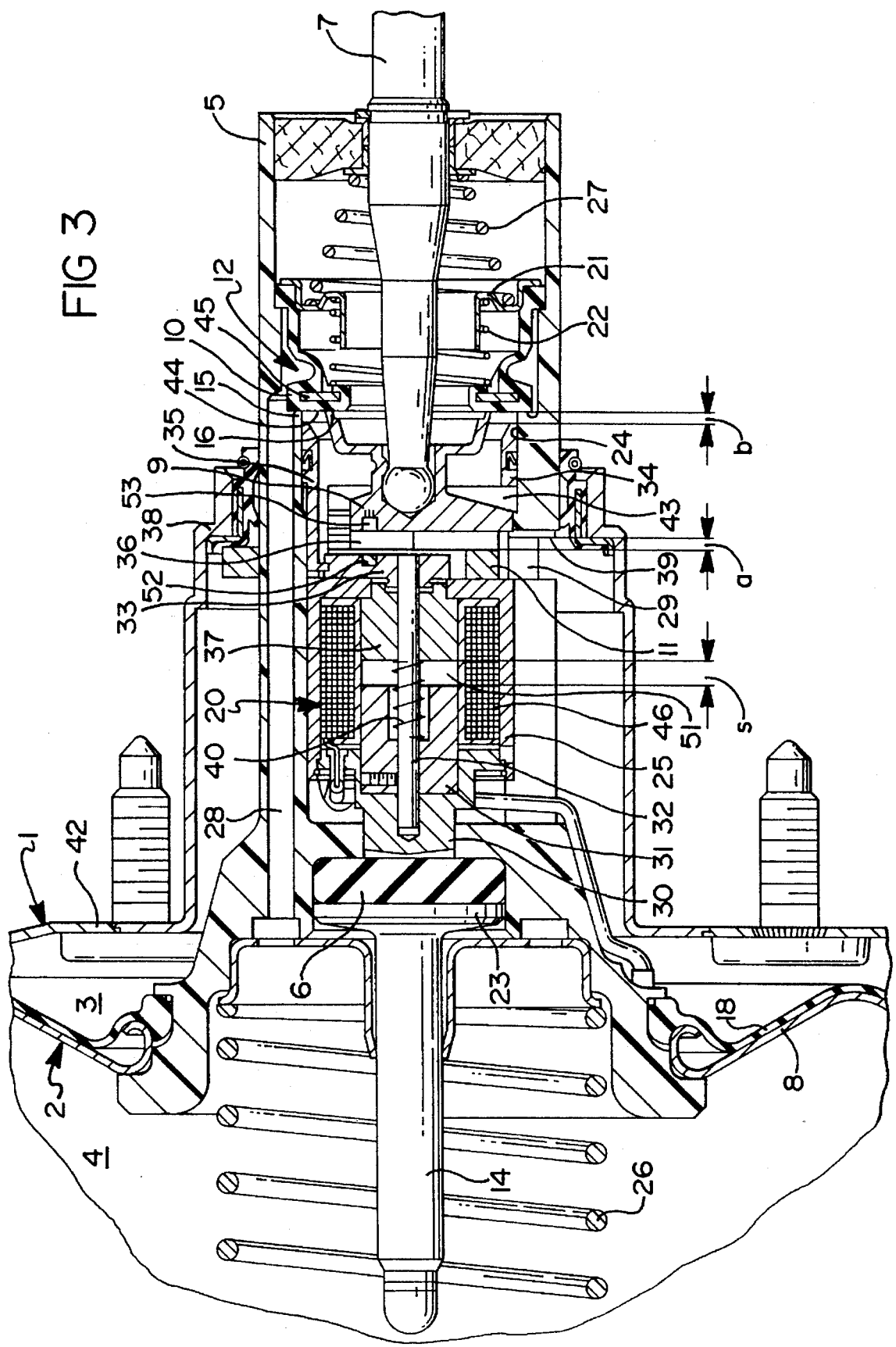
FIG. 3 is a third embodiment of the vacuum brake power booster according to the present invention in a view corresponding to FIG. 1.
Figure 4:
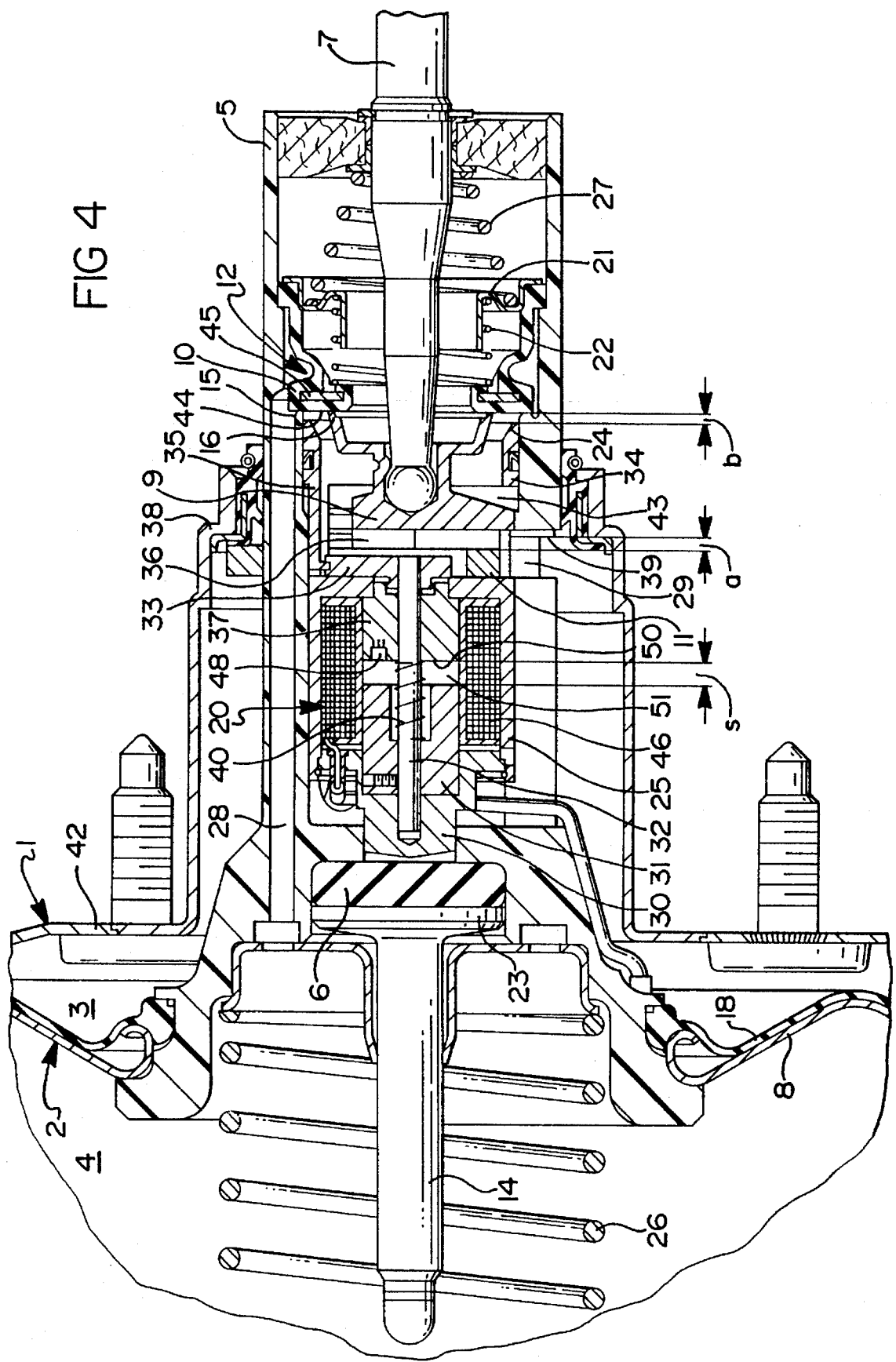
FIG. 4 is a fourth embodiment of the vacuum brake power booster according to the present invention in a view corresponding to FIG. 1.
Figure 5:
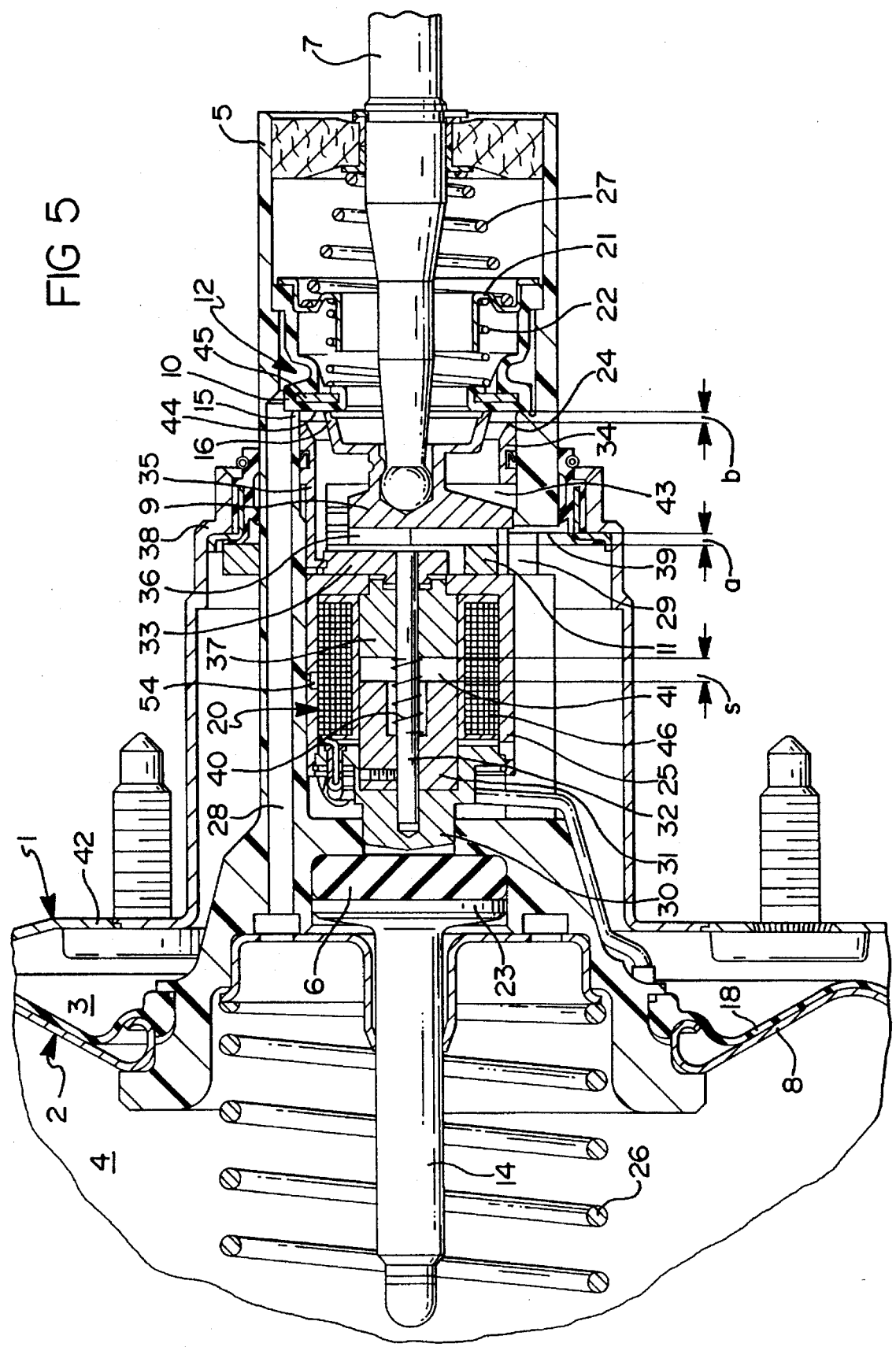
FIG. 5 is a fifth embodiment of the vacuum brake power booster according to the present invention in a view corresponding to FIG. 1.

In the embodiments shown in FIGS. 3, 4 and 5, a means is provided which permits the actuating travel of the valve member 10 to be defined. This definition is effected by sensing the actuating travel of the armature 31 of the electromagnet 20.

Thus, FIG. 3 shows an indirect measurement of the mentioned actuating travel at the ring 34 carrying the third sealing seat 24 in which the absolute travel of the electromagnet armature 31 towards the valve piston 9 is measured. For this purpose, a second permanent magnet 52 is integrated in the force-transmitting plate 33, while a second Hall effect sensor 53 is arranged in the valve piston 9 axially opposite to the permanent magnet 52. However, as the third sealing seat 24, in its inactive position, is at a distance from the valve member 10, until the contact between the third sealing seat 24 and the valve member 10, there is no proportional relationship to said, actuating travel. This fact has to be taken into account when analyzing the Hall effect sensor signals.

Principally, another possibility is to sense the magnetic flux density B of the electromagnet 20 used for the independent actuation of the control valve which permits to approximate the presently prevailing value "S" of the working air gap 51. Since the magnetic flux density B, among others, depends on the current I supplied to the electromagnet 20, the current values must be measured simultaneously.

Thus, FIG. 4 shows an arrangement wherein the flux density B is sensed in the working air gap 51 of the electromagnet 20. An analogously operating Hall effect sensor 48 is arranged in the working air gap 41 such that the flux density of the electromagnet 20 can be sensed continuously. Preferably, the Hall effect sensor 48 is integrated in the end surface 50 of the previously mentioned guide portion 37, which end surface is close to the electromagnet armature 31.

FIG. 5 shows a better exploitation, in particular, of the end surface 50 of the guide portion 37 cooperating with the electromagnet armature 31. In the embodiment shown therein, a likewise analogously operating Hall effect sensor 54 is arranged in the return path of the electromagnet 20, in particular, is integrated in the wall of the bowl-shaped extension 25 of the valve piston 9 which accommodates the electromagnet 20.

The correlation between the magnetic flux density B, the current I supplied to the electromagnet 20 and the distance "s" of the working air gap 41 is generally defined as:

$$B = f(I, s).$$

Figure 6:
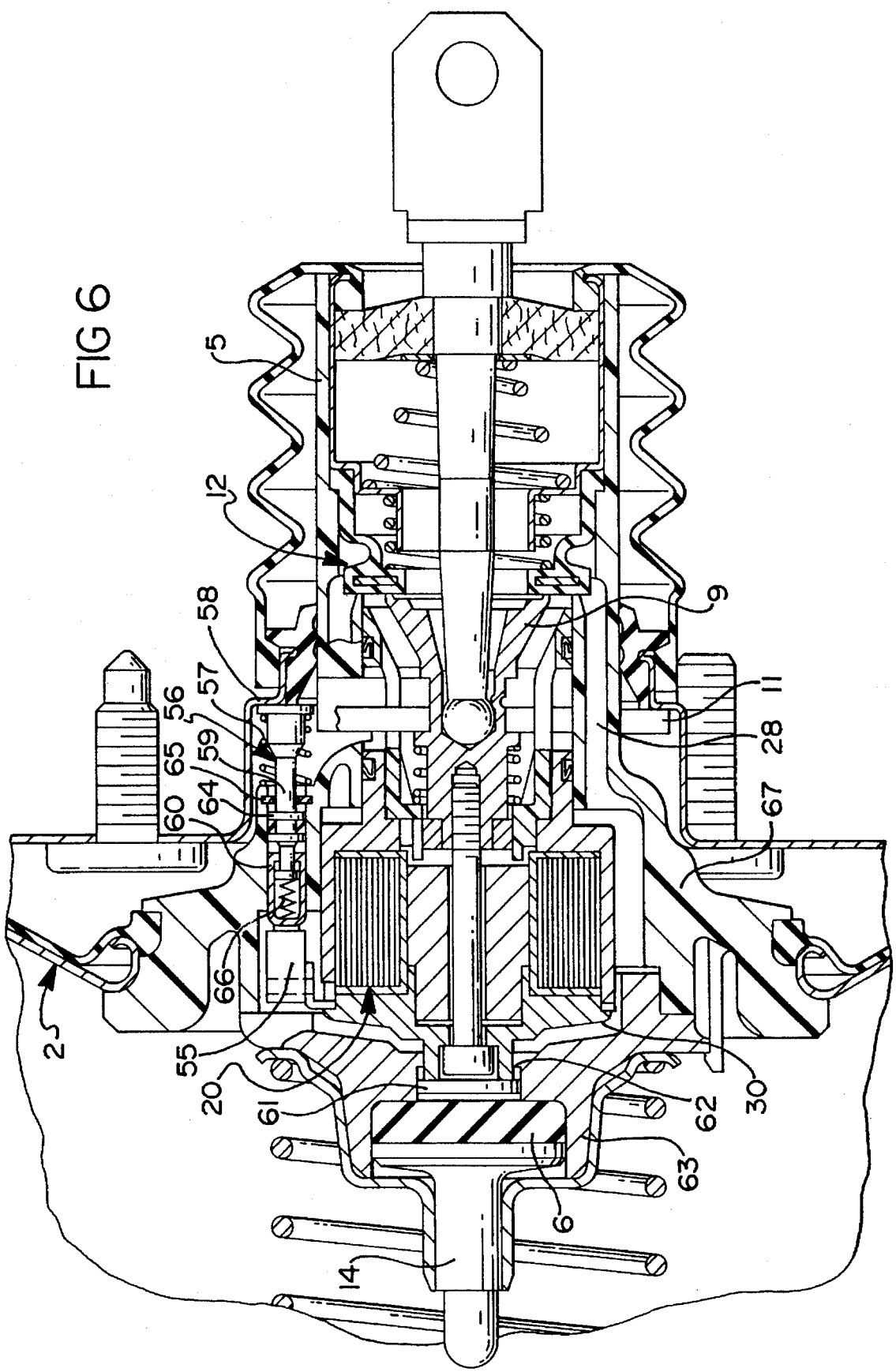
FIG. 6 is a sixth embodiment of the vacuum brake power booster according to the present invention in a view corresponding to FIG. 1.

In the embodiment of the vacuum brake power booster according to the present invention illustrated in FIG. 6, finally, electrical switching means 55, 56 are provided which are important especially in braking operations in which the electromagnet 20 is driven in addition to brake application by the driver in order to perform full braking irrespective of driver will (so-called brake assistant function). It is of special significance that the switching means 55, 56 are actuated during each braking operation. Simultaneously, it must be ensured that the electromagnet 20 is reliably switched off after the braking operation assisted by independent force is completed. The illustrated switching means consist of a microswitch 55 that is, preferably, attached to the valve piston 9. The switch preferably has two actuating positions. Actuating element 56 actuates the microswitch 55 by a translator, movement and is sealedly guided in a bore contained in the control housing 5 or 67, respectively, and cooperates with a stop on the booster housing which is assigned the reference numeral 58 and, for example, can be formed by a radial collar of the rear booster housing shell.

A compression spring 57 is interposed between the actuating element 56 and the control housing 5 or 67, respectively, so that the end of the actuating element 56 remote from the microswitch 55 abuts under preload on the stop 58. It is particularly favourable that the actuating element 56 is formed of two parts 56, 60 which are guided telescopically in each other and which are pushed apart axially by means of a second compression spring 66. The part 59 abutting on the stop 58 is composed of an actuating tappet whose movement in the control housing 5 or 67, respectively, is limited by way of a radial collar 64 which cooperates with a circlip 65 provided in the control housing 5 or 67, respectively. The second part 60 serving to actuate the microswitch 55 is provided in the shape of a sleeve guided on the actuating tappet 59 and accommodating the second compression spring 66.

Finally, as can be taken from FIG. 6, the control housing 5 of the booster version illustrated therein is of bipartite design and consists of a guide portion 67, which is guided in the booster housing and accommodates the control valve 12 including the electromagnet 20, and a front part 63 positively connected with the guide portion 67. Between the previously mentioned reaction disc 6 and the closure portion 30 of the valve piston 9, a transmission disc 61 is arranged so as to be slidable within limits which permits to add the actuating force introduced by the driver through the valve piston 9 to the boosting force generated by the movable wall 2. The movement of the transmission disc 61 in opposition to the actuating direction is confined by a stop surface or annular surface 62, respectively, provided in the front part 63 so that, if required, further movement of the valve piston 9 in opposition to the actuating direction is possible.

In release position, of the vacuum brake power booster according of the present invention adopts the position shown in FIG. 6. The compression spring 57 is slightly compressed by the actuating tappet 59 abutting on the stop 58 so that an axial distance (or clearance) forms between the collar 64 and the clip 65. The microswitch 55, which is disposed in its first actuating position, is supported axially on the sleeve 60. The control housing 5 or 67, respectively, as well as the valve piston 9, through the transverse member 11, bear against the booster housing, while the closure portion 30 of the valve piston 9 abuts on the transmission disc 61 which, in turn, is spaced from the stop surface or annular surface 62, respectively, as well as from the reaction disc 6.

Figure 7A:
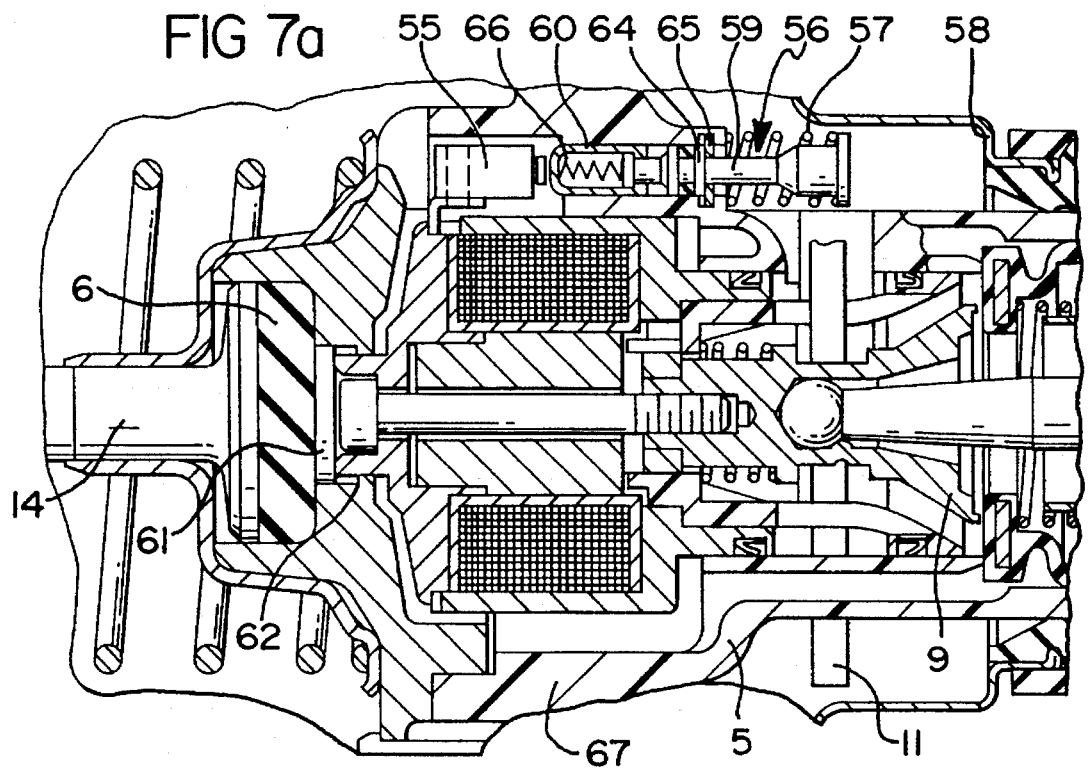
FIG. 7 is the individual modes of actuation of the vacuum brake power booster according to the present invention illustrated in FIG. 6.

When a normal (partial) braking operation is initiated by the driver by actuating the valve piston 9, the valve piston 9 lifts from the transverse member 11, while the transmission disc 61 is moved into contact with the reaction disc 6 (see FIG. 7a). Due to the relative movement between valve piston 9 and control housing 5 or 67, respectively, the microswitch 55 moves away from the actuating element 56, as a result whereof it is changed over to its second actuating position. The actuating condition of the microswitch 55 is signalled to a non-illustrated control electronics which serves to actuate the electromagnet 20. When the electromagnet 20 is not actuated, signalling serves to check proper functioning of the switching means 55, 56. Relieving the compression spring 57 causes the actuating tappet 59 to reset so far that its collar 64 moves into abutment with the circlip 65. Simultaneously, the actuating tappet 59 and the sleeve 60 are urged apart until their limit stop by the second compression spring 66.

Figure 7B:
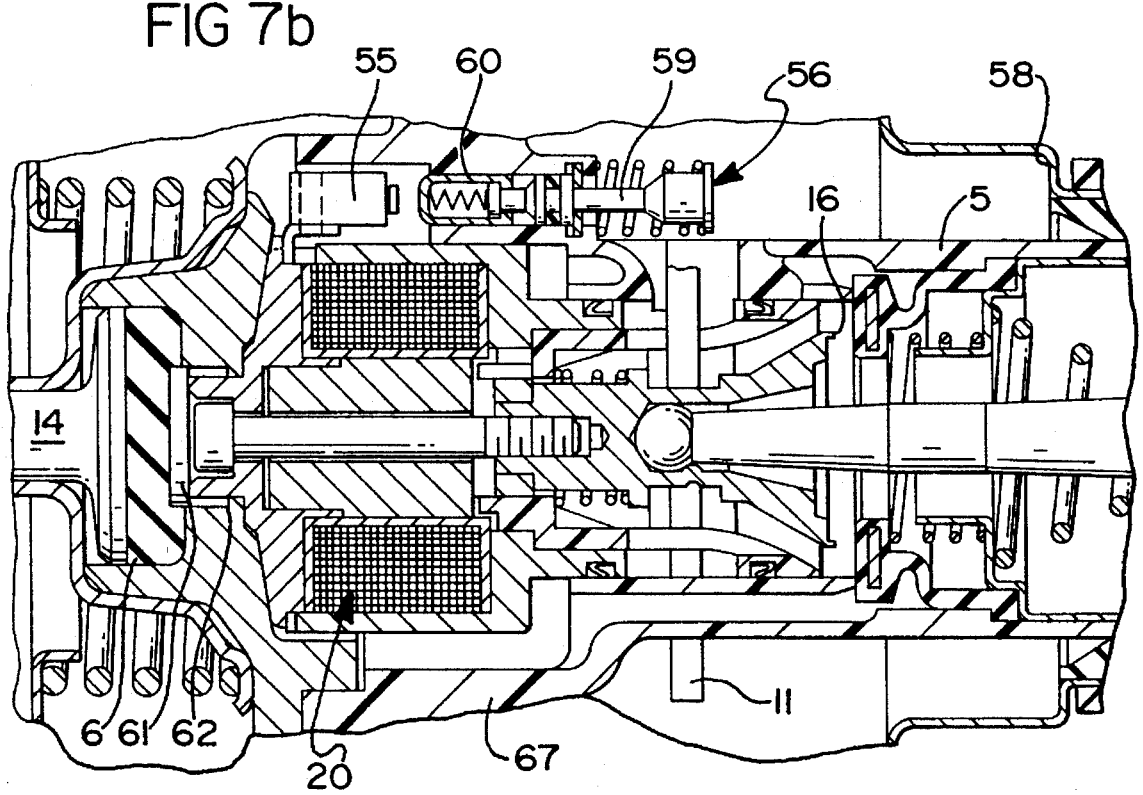

The full braking position initiated by the driver is shown in FIG. 7b. Because the microswitch 55 now as before is spaced from its actuating element 56 or 60, respectively, its actuating condition has not changed so that it remains in its second actuating position. In the full braking position, there is merely an increase in the distance between the switching means 55, 56, the transmission disc 61 being urged into the rubber-elastic reaction disc 6.

Figure 7C:
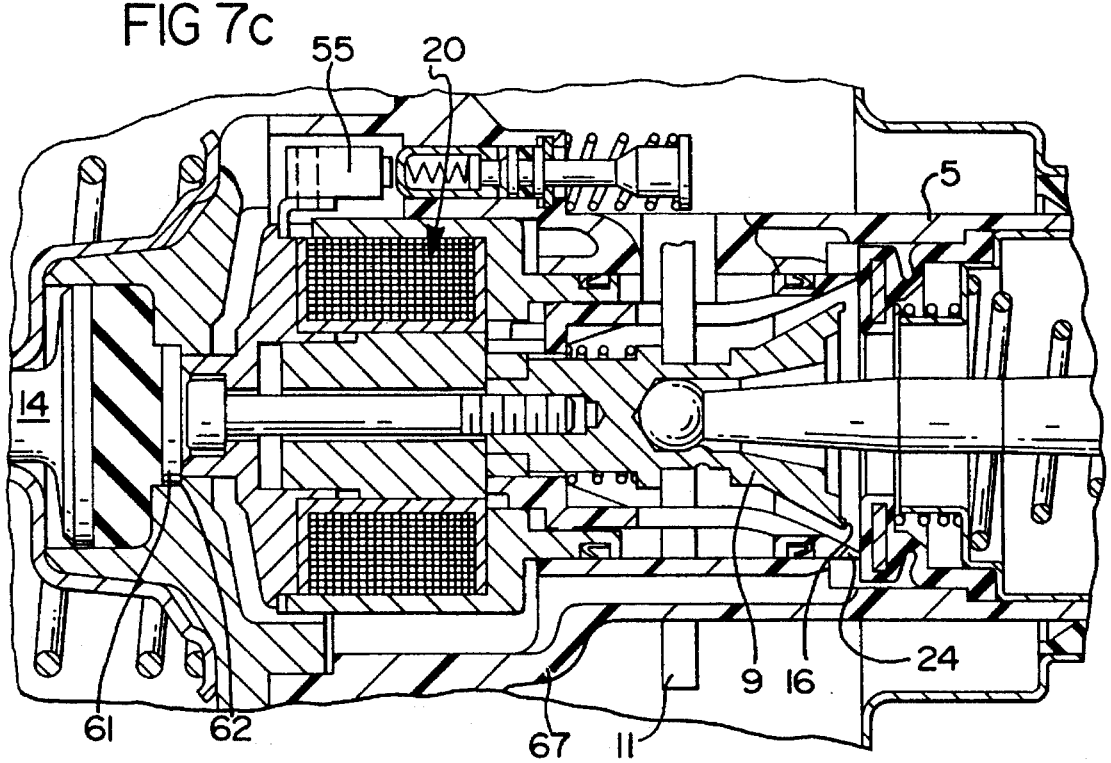

FIG. 7c shows the full braking position caused by quick actuation by the driver, which was initiated by the non-illustrated electronics, the electromagnet 20 being actuated at the same time. The movement of the valve piston 9 relative to the control housing 5 or 67, respectively, causes change-over of the microswitch 55 to its second actuating position which permits to activate the electromagnet 20. The additional ventilation of the working chamber 3, which is due to further opening of the (atmospheric) sealing seat 16 provided on the valve piston 9 caused by actuation of the third sealing seat 24, results in an advance movement of the control housing 5 in relation to the valve piston 9, during which movement the transverse member 11 adopts an intermediate position in which there is no contact between it and the control housing 5 or 67, respectively. Under the effect of a reaction force acting upon the push rod 14, the reaction disc 6 is urged into the recess in the control-housing guide portion 67, which recess accommodates the transmission disc 61, so long until the transmission disc 61 abuts on the annular surface 62. Abutting of the transmission disc 61 prevents the transmission of the reaction force to the valve piston 9 so that the reaction force cannot be felt at the actuating pedal or brake pedal.

When the release action (decrease of the actuating force) takes place slowly, the microswitch 55 is changed over only upon abutment of the actuating element 56 or 59, respectively, on the stop 58 (FIG. 6).

Figure 7D:
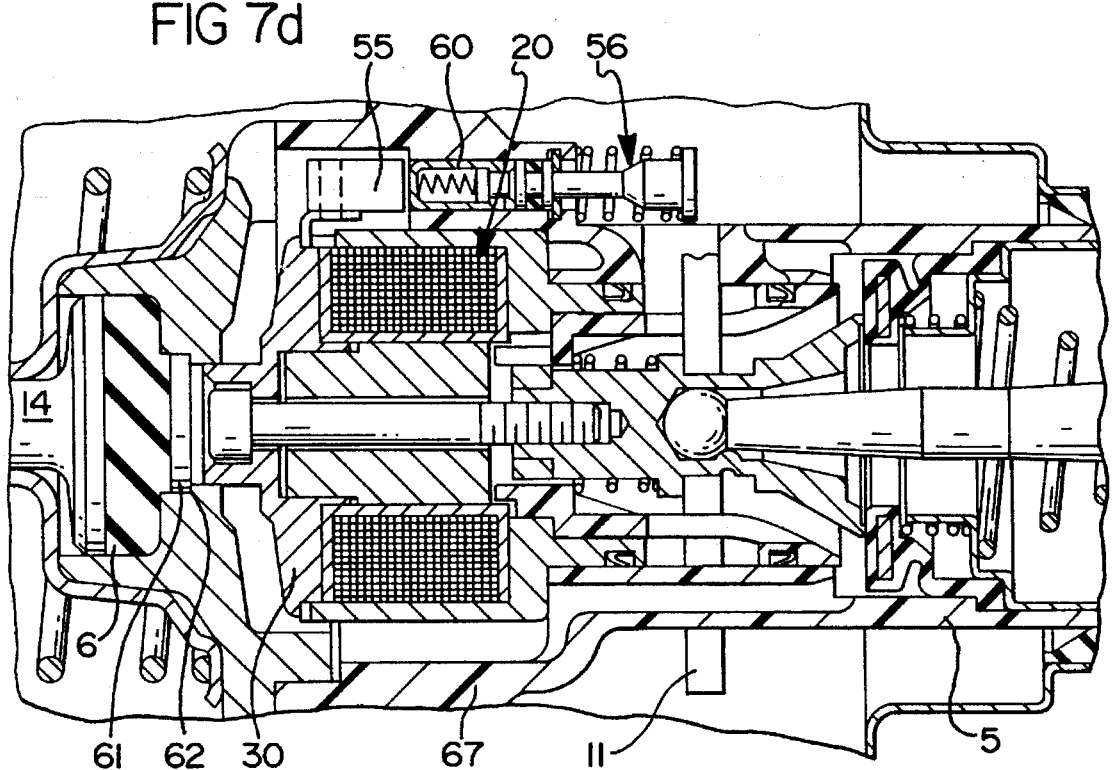

When the release action takes place quickly, or, respectively, when the actuating force decreases during full braking initiated by actuation of the electromagnet 20 (FIG. 7d), change-over of the microswitch 55 to the first actuating position is effected by its abutment on the actuating element 56 or 60, respectively. The change-over action is signalled to the previously mentioned electronics which produces a control signal resulting in disconnection of the electromagnet 20. The control housing 5 or 67, respectively, is entrained by the transverse member 11 abutting thereon, while the transmission disc 61 is urged by the flowing material of the reaction disc 6 against the stop surface or annular surface 62, respectively. The axial distance between the end of the valve piston 9 and 30, respectively, and the transmission disc 61 corresponds to the release stroke which is necessary for the release action of the brake device from the full braking actuated by the electromagnet 20.

List of Reference Numerals 1 booster housing
2 movable wall
3 working chamber
4 vacuum chamber
5 control housing
6 reaction disc
7 actuating rod
8 diaphragm plate
9 valve piston
10 valve member
11 transverse member
12 control valve
13 sealing lip
14 push rod
15 sealing seat
16 sealing seat
17 chamber
18 rolling diaphragm
19 duct
20 electromagnet
21 retaining ring
22 valve spring
23 head flange
24 sealing seat
25 extension
26 resetting spring
27 piston-rod return spring
28 channel
29 channel
30 closure member
31 armature
32 pin
33 force-transmitting plate
34 ring
35 retaining arm
36 groove
37 guide portion
38 stop
39 stop surface
40 spring
41 valve
42 housing half
43 annular chamber
44 sealing surface
45 reinforcing disc
46 coil
47 permanent magnet
48 Hall effect sensor
49 Hall effect sensor
50 end surface
51 working air gap
52 permanent magnet
53 Hall effect sensor
54 Hall effect sensor
55 microswitch
56 actuating element
57 compression spring
58 stop
59 actuating tappet
60 sleeve
61 transmission disc
62 annular surface
63 front part
64 collar
65 circlip
66 compression spring
67 guide portion

We claim:

1. A vacuum brake power booster for automotive vehicles comprising:

a booster housing whose interior is subdivided into a vacuum chamber and a working chamber by a movable wall, a control housing carrying the movable wall and accommodating a control valve which controls a pressure differential acting upon the movable wall, an actuating rod composed of a first sealing seat provided in the control housing and a second sealing seat provided on the valve piston displaceable by the actuating rod, said first and second sealing seats being arranged concentrically in relation to one another, as well as of an elastically deformable valve member, a movable third sealing seat being provided which is operable by an electromagnet, which is arranged concentrically in relation to the sealing seats and which permits ventilation of the working chamber irrespective of the position of the actuating rod, wherein the electromagnet, is rigidly coupled to the valve piston and resides in the control housing in a slidable relation therewith (9), wherein the third sealing seat is synchronously movable with the valve piston.

2. A vacuum brake power booster as claimed in claim 1, further including a push rod supported by said control housing by the intermediary of a rubber-elastic reaction disc wherein the electromagnet is arranged in a preferably bowl-shaped axial extension of the valve piston, the extension being closed by a closure member which, additionally, permits transmitting the input force introduced at the actuating rod to the reaction disc.

3. A vacuum brake power booster as claimed in claim 1 wherein the armature of the electromagnet projects partly into the closure member, the force transmission between the third sealing seat and the armature taking place by means of a cylindrical pin to which a force-transmitting plate carrying the third sealing seat is secured.

4. A vacuum brake power booster as claimed in claim 1 wherein the third sealing seat is provided on a ring which is sealedly guided in the control housing and is connected to the force-transmitting plate by means of at least two retaining arms, preferably opposed in radial direction.

5. A vacuum brake power booster as claimed in claim 1 wherein the force-transmitting plate has a rectangular configuration and is arranged in a radial groove in the valve piston.

6. A vacuum brake power booster as claimed in claim 1 wherein the third sealing seat is interposed radially between the first and second sealing seats.

7. A vacuum brake power booster as claimed in claim 1 wherein the third sealing seat is arranged in an axially offset manner with respect to the second sealing seat.

8. A vacuum brake power booster as claimed in claim 1, wherein the pin is guided in the closure member and in a glide portion arranged in the extension of the valve piston.

9. A vacuum brake power booster as claimed in claim 1, wherein the valve piston abuts on a stop on the booster housing through a transverse member which is arranged in the control housing with axial play, and wherein the third sealing seat, in the release position, is arranged at a distance (b) from the valve member which is larger than, or equal to, the distance (a) between the transverse member and a stop surface provided in the control housing and allowing to entrain the transverse member on actuation.

10. A vacuum brake power booster as claimed in claim 8 wherein a spring is interposed between the armature and the guide portion and biases the armature in opposition to the actuating direction of the electromagnet.

11. Vacuum brake power booster as claimed in claim 1, wherein the third sealing seat is operable only to the effect of separating the chambers, and wherein a valve operable independently of the electromagnet is provided which ventilates the working chamber irrespective of the control valve.

12. A vacuum brake power booster as claimed in claim 11, wherein the booster housing composed of two interconnected housing halves, and wherein the valve is arranged at housing half confining the working chamber.

13. A vacuum brake power booster as claimed in claim 11 wherein the valve is provided as a pneumatic solenoid valve which is closed when deenergized.

14. A vacuum brake power booster as claimed in claim 1, wherein the valve member in the control housing confines a pneumatic chamber, to which the pneumatic pressure prevailing in the working chamber is applied.

15. A vacuum brake power booster as claimed in claim 14, wherein the valve member is provided with at least one passage in the area of its sealing surface which establishes a connection between an annular chamber, confined by the sealing seats and connected with the working chamber, and the pneumatic chamber.

16. A vacuum brake power booster as claimed in claim 14 wherein the valve chamber is provided with a radially inwardly disposed sealing lip in the area of its sealing surface which lip, together with a retaining ring holding the valve member in the control housing (5), confines the pneumatic chamber.

17. A vacuum brake power booster as claimed in claim 1, further including means for detecting the actual position of the valve member.

18. A vacuum brake power booster as claimed in claim 17, further including means for sensing the actuating travel of the valve member (10).

19. A vacuum brake power booster as claimed in claim 18, wherein said sensing means includes a Hall effect sensor integrated in the control housing, and cooperates with a permanent magnet which is integrated in the valve member.

20. A vacuum brake power booster as claimed in claim 18, wherein said sensing means includes a Hall effect sensor disposed in the valve member and cooperates with a permanent magnet that is arranged in control housing, preferably in the area of the first sealing seat.

21. A vacuum brake power booster as claimed in claim 17, further including means for sensing the actuating travel of the valve member.

22. A vacuum brake power booster as claimed in claim 21, wherein the third sealing seat is provided on a ring that is sealedly guided in the control housing and is secured to a force-transmitting plate which is in force-transmitting connection with the armature, and further including a permanent magnet arranged in the force-transmitting plate for cooperating with a Hall effect sensor arranged in the valve piston.

23. A vacuum brake power booster as claimed in claim 21, further including means for sensing the density of the magnetic flux in an working air gap of the electromagnet, while the current supplied to the electromagnet is measured simultaneously.

24. A vacuum brake power booster as claimed in claim 23, wherein the working air gap of the electromagnet is provided between an armature and a guide portion that is arranged within the valve piston, and wherein a Hall effect sensor is arranged in the guide portion on its side facing the armature.

25. A vacuum brake power booster as claimed in claim 23, further including a Hall effect sensor arranged in a return path of the electromagnet.

26. A vacuum brake power booster as claimed in claim 25, further including an electromagnet arranged in an extension of the valve piston, wherein the Hall effect sensor is integrated in the wall of the extension.

27. A vacuum brake power booster as claimed in claim 1, further including an electrical switching means, the control signals of which influence the current supply of the electromagnet.

28. A vacuum brake power booster as claimed in claim 27, wherein the switching means are operable by a relative movement between the valve piston and the control housing.

29. A vacuum brake power booster as claimed in claim 28, wherein the switching means include a microswitch arranged at the valve piston and an actuating element arranged at or in the control housing.

30. A vacuum brake power booster as claimed in claim 29, wherein the actuating element is arranged so as to be movable relative to the control housing and resiliently biassed in opposition to the actuating direction.

31. A vacuum brake power booster as claimed in claim 30, wherein the actuating element abuts on a stop formed fast with the booster housing under the preload of a compression spring in such a manner that an axial clearance is formed between it and the control housing at its end close to the microswitch.

32. A vacuum brake power booster as claimed in claim 27, wherein the actuating element is formed of two resiliently biassed parts which are telescopically guided in one another.

33. A vacuum brake power booster as claimed in claim 32, wherein the actuating element is formed of an actuating tappet that is sealedly guided in the control housing and cooperates with the stop, and of a sleeve which is anchored at the actuating tappet in a resiliently biassed manner, which is arranged coaxially to the actuating tappet and cooperates with the microswitch.

34. A vacuum brake power booster as claimed in claim 1 wherein the valve piston is movable into force-transmitting engagement with a reaction disc arranged in the control housing which permits to transmit the output force of the vacuum brake power booster to a force output member, and wherein the valve piston is in axial abutment with the reaction disc by means of a transmission disc which is mounted in the control housing so as to be axially movable within limits, the movement of which in opposition to the actuating direction of the vacuum brake power booster is limited by a stop provided in the control housing and allowing further movement of the valve piston in opposition to the actuating direction.

35. A vacuum brake power booster as claimed in claim 1, wherein the control housing is of bipartite design and includes a front part which is positively connected with a guide portion accommodating the control valve, and which accommodates the force output member, the reaction disc and the transmission disc.

* * * * *